US012633811B2

(12) United States Patent
Mao et al.

(10) Patent No.: US 12,633,811 B2
(45) Date of Patent: May 19, 2026

(54) LINEAR VIBRATION MOTOR WITH MOVING COIL AND IRON CORE

(71) Applicant: AAC Technologies (Nanjing) Co., Ltd., Nanjing (CN)

(72) Inventors: Lubin Mao, Nanjing (CN); Yun Tang, Nanjing (CN); Jie Ma, Nanjing (CN)

(73) Assignee: AAG Technologies (Nanjing) Co., Ltd., Nanjing (CN)

( * ) Notice: Subject to any disclaimer, the term of this patent is extended or adjusted under 35 U.S.C. 154(b) by 198 days.

(21) Appl. No.: 18/395,661

(22) Filed: Dec. 25, 2023

(65) Prior Publication Data

US 2024/0405651 A1    Dec. 5, 2024

Related U.S. Application Data

(63) Continuation of application No. PCT/CN2023/096710, filed on May 29, 2023.

(51) Int. Cl.
  *H02K 33/02* (2006.01)
  *H02K 1/18* (2006.01)
  *H02K 5/04* (2006.01)
  *H02K 33/18* (2006.01)
(52) U.S. Cl.
  CPC .............. *H02K 33/02* (2013.01); *H02K 1/18* (2013.01); *H02K 5/04* (2013.01); *H02K 33/18* (2013.01)
(58) Field of Classification Search
  CPC ........ H02K 33/02; H02K 33/18; H02K 35/04; H02K 5/04; H02K 1/18; H02K 1/182; H02K 1/185; H02K 1/187

USPC ............................................. 310/15, 21, 32
See application file for complete search history.

(56) References Cited

U.S. PATENT DOCUMENTS

| | | | |
|---|---|---|---|
| 5,896,076 A * | 4/1999 | van Namen | .......... H01F 7/1615 335/229 |
| 2018/0166961 A1* | 6/2018 | Guo | ........................ H02K 33/18 |
| 2020/0212775 A1* | 7/2020 | Tang | ..................... H02K 33/16 |

FOREIGN PATENT DOCUMENTS

JP      2020054958 A  *  4/2020

OTHER PUBLICATIONS

Machine translation of JP-2020054958-A. (Year: 2020).*

* cited by examiner

Primary Examiner — Michael Andrews
(74) Attorney, Agent, or Firm — Wiersch Law Group

(57) ABSTRACT

A linear vibration motor, including a housing having a receiving space; a vibration assembly and a stator assembly that are received in the receiving space; and an elastic member supporting the vibration assembly in the receiving space. The vibration assembly includes a weight suspended in the receiving space, and the weight has a receiving hole penetrating through the weight. The vibration assembly further includes an iron core fixed to the weight and received in the receiving hole, and a coil wound around the iron core; and the stator assembly includes a magnet fixed to the housing, and the magnet extends into the receiving hole and is spaced from the coil and the weight. The linear vibration motor has an improved electromagnetic field utilization rate of the iron core and the coil and enhanced magnetic field intensity of the magnet, and an improved driving force and vibration performance.

7 Claims, 4 Drawing Sheets

100

Vibrating direction

<u>100</u>

100

Vibrating direction

A–A

B-B

First direction

LINEAR VIBRATION MOTOR WITH MOVING COIL AND IRON CORE

CROSS-REFERENCE TO RELATED APPLICATIONS

This application is a continuation of International Application No. PCT/CN2023/096710, filed on May 29, 2023, which is hereby incorporated by reference in its entirety.

TECHNICAL FIELD

The present disclosure relates to the technical field of motors, and in particular, to a linear vibration motor for a portable mobile terminal.

BACKGROUND

With the development of electronic technologies, portable electronic products, such as mobile phones and handheld game consoles, have become more and more popular, and these electronic products generally use linear vibration motors to provide vibration feedback.

A linear vibration motor in the related art includes a housing having a receiving space, a vibration assembly arranged in the receiving space, a stator assembly fixed to the housing, and an elastic member supporting the vibration assembly. The stator assembly generally includes a solenoid including a coil and an iron core. The vibration assembly includes a weight and a magnet fixed to the weight. The solenoid interacts with the magnet to generate a driving force to drive the vibration assembly to vibrate back and forth, thereby providing a vibration. However, the driving force of the solenoid and the magnet of the linear vibration motor in the related art is not fully exerted, so that the vibration feedback of the linear vibration motor cannot be optimized.

In view of this, it needs to provide a new linear vibration motor to solve the above-mentioned technical problems.

SUMMARY

An object of the present disclosure is to provide a linear vibration motor with an improved driving force and a better vibration performance.

An embodiment of the present disclosure provides a linear vibration motor, including: a housing having a receiving space; a vibration assembly and a stator assembly that are received in the receiving space; and an elastic member supporting the vibration assembly in the receiving space. The vibration assembly includes a weight suspended in the receiving space, and the weight has a receiving hole penetrating through the weight. The vibration assembly further includes an iron core fixed to the weight and received in the receiving hole, and a coil wound around the iron core; and the stator assembly includes a magnet fixed to the housing, and the magnet extends into the receiving hole and is spaced from the coil and the weight.

As an improvement, the weight includes a side wall enclosing the receiving hole, and an end portion of the iron core is fixed to the side wall.

As an improvement, the weight is formed as a rectangular shape, and the side wall includes first side walls each extending along a long axis direction and arranged opposite to each other, and second side walls each extending along a short axis direction and arranged opposite to each other.

As an improvement, the magnet includes two first magnets arranged at two sides of the coil along a first direction and two second magnets arranged at two sides of the coil along a second direction, and the two first magnets and the two second magnet are spaced and arranged at a periphery of the coil. The first direction, the second direction, and a vibrating direction of the vibration assembly are perpendicular to each other.

As an improvement, the two first magnets are magnetized along the first direction, and the two first magnets are arranged with same poles facing each other along the first direction; and the two second magnets are magnetized along the second direction, and the two second magnets are arranged with same poles facing each other along the second direction.

As an improvement, each of the two first magnets and the two second magnets is formed as a three-section magnetizing structure.

As an improvement, a side of the coil along the first direction is provided with three first magnets arranged in sequence along the vibrating direction, and a magnetizing direction of the first magnet arranged at a center is opposite to a magnetizing direction of the first magnet arranged at each of two ends; and a side of the coil along the second direction is provided with three second magnets arranged in sequence along the vibrating direction, and a magnetizing direction of the second magnet arranged at a center is opposite to a magnetizing direction of the second magnet arranged at each of two ends.

As an improvement, the weight further includes a fixing boss formed by protruding from the second side wall, and the end portion of the iron core is fixed to the fixing boss.

As an improvement, the iron core includes an end surface fixed to the fixing boss, and the iron core has an adhesive receiving groove formed by recessing in a direction from the end surface away from the fixing boss.

As an improvement, the housing includes an upper cover and a lower cover spaced from each other, and a side wall connecting both the upper cover and the lower cover; wherein the upper cover, the lower cover and the side wall jointly enclose the receiving space, an end of the elastic member is fixed to the side wall, another end of the elastic member is fixed to the weight, and one of the two second magnets is fixed to the upper cover and the other one of the two second magnets is fixed to the lower cover.

BRIEF DESCRIPTION OF DRAWINGS

In order to better illustrate the technical solutions in the embodiments of the present disclosure, the drawings which are needed in the description of the embodiments will be briefly introduced as follows, it should be noted that the drawings in the following description are only some of, not all of the embodiments of the present disclosure, and for those of ordinarily skilled in the art, other drawings can also be obtained in accordance with these drawings without any creative effort.

DESCRIPTION OF EMBODIMENTS

Figure 1:
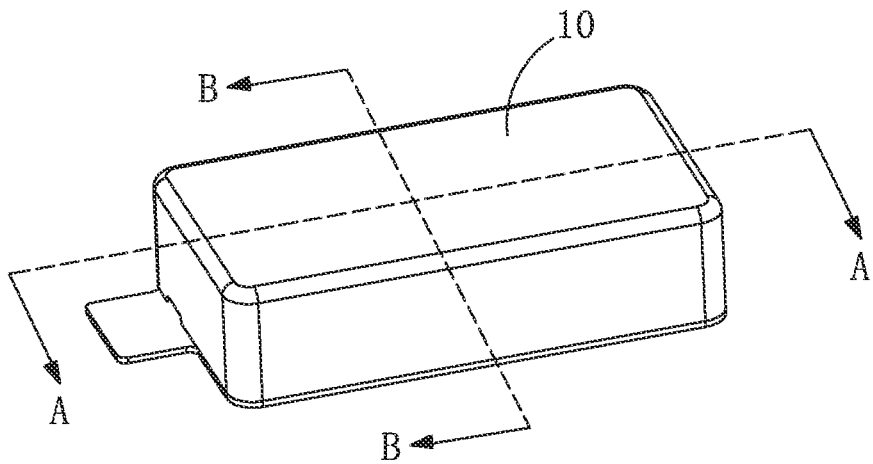
FIG. 1 is a perspective view of a linear vibration motor according to a first embodiment of the present disclosure.
Figure 2:
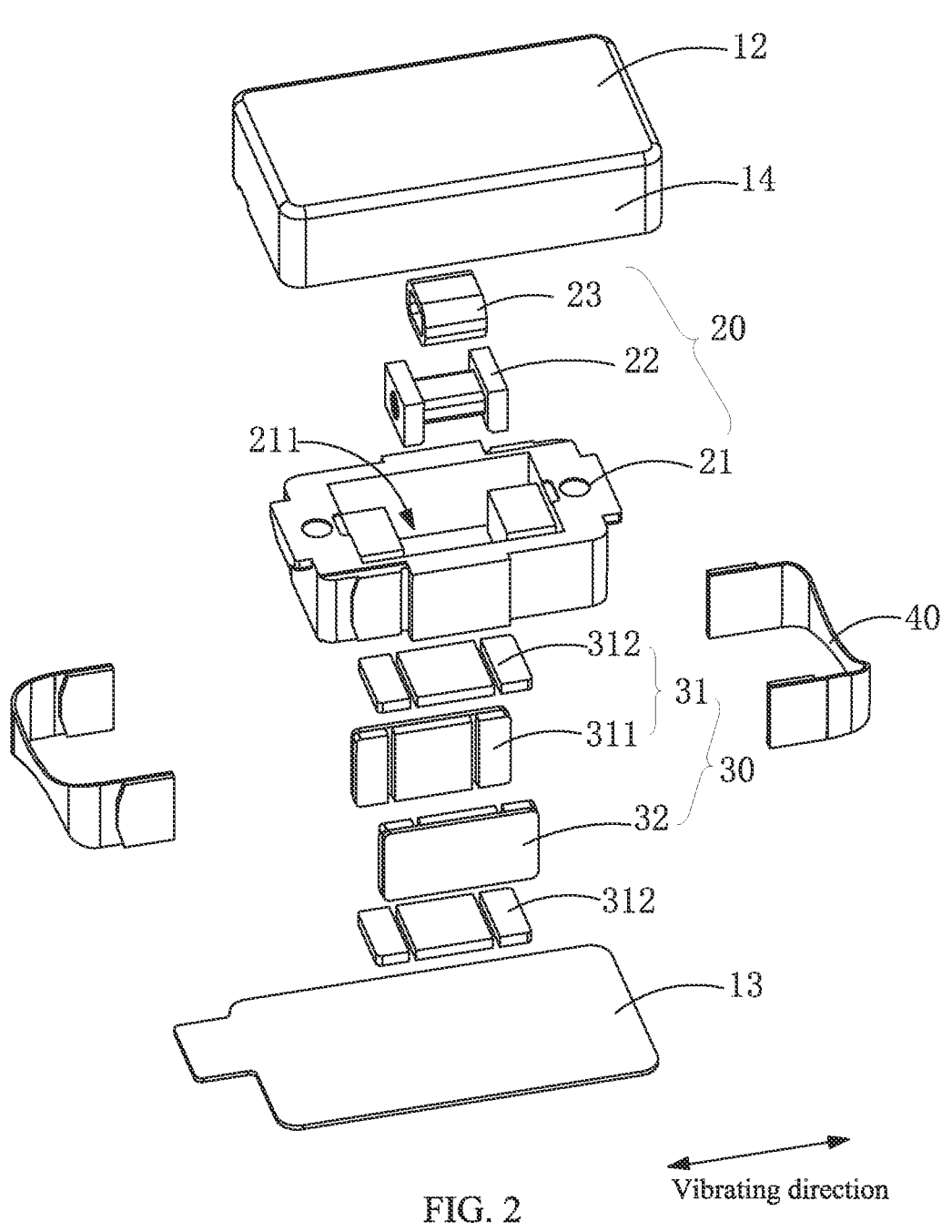
FIG. 2 is an exploded view of the linear vibration motor in FIG. 1.
Figure 3:
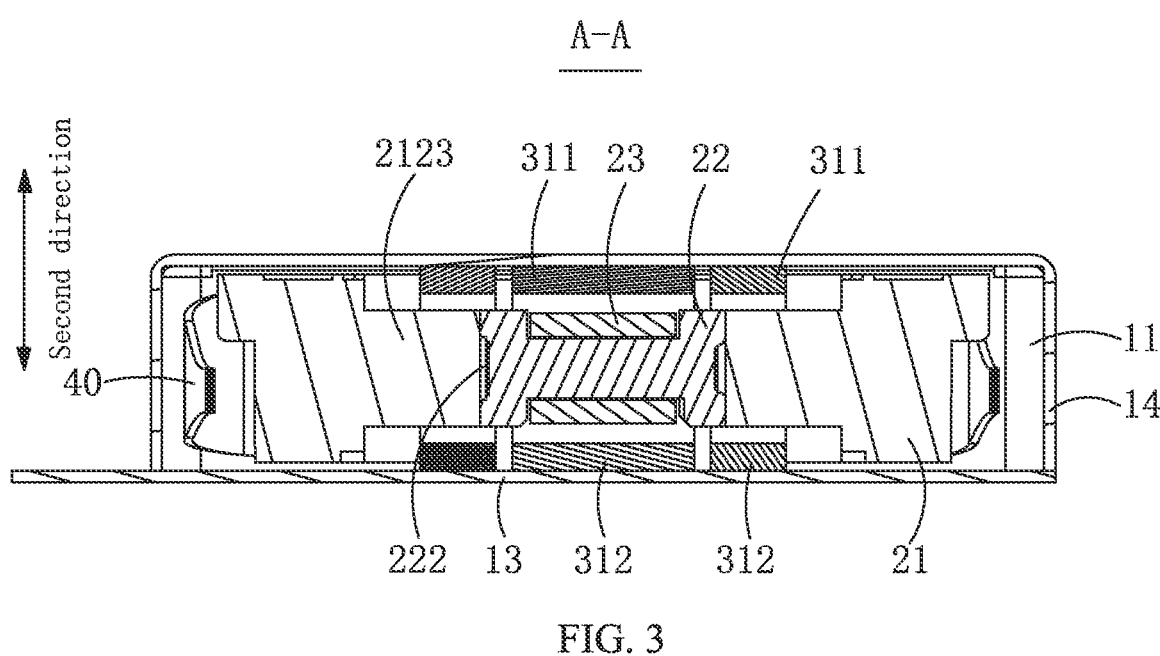
FIG. 3 is a sectional view taken along A-A in FIG. 1.
Figure 4:
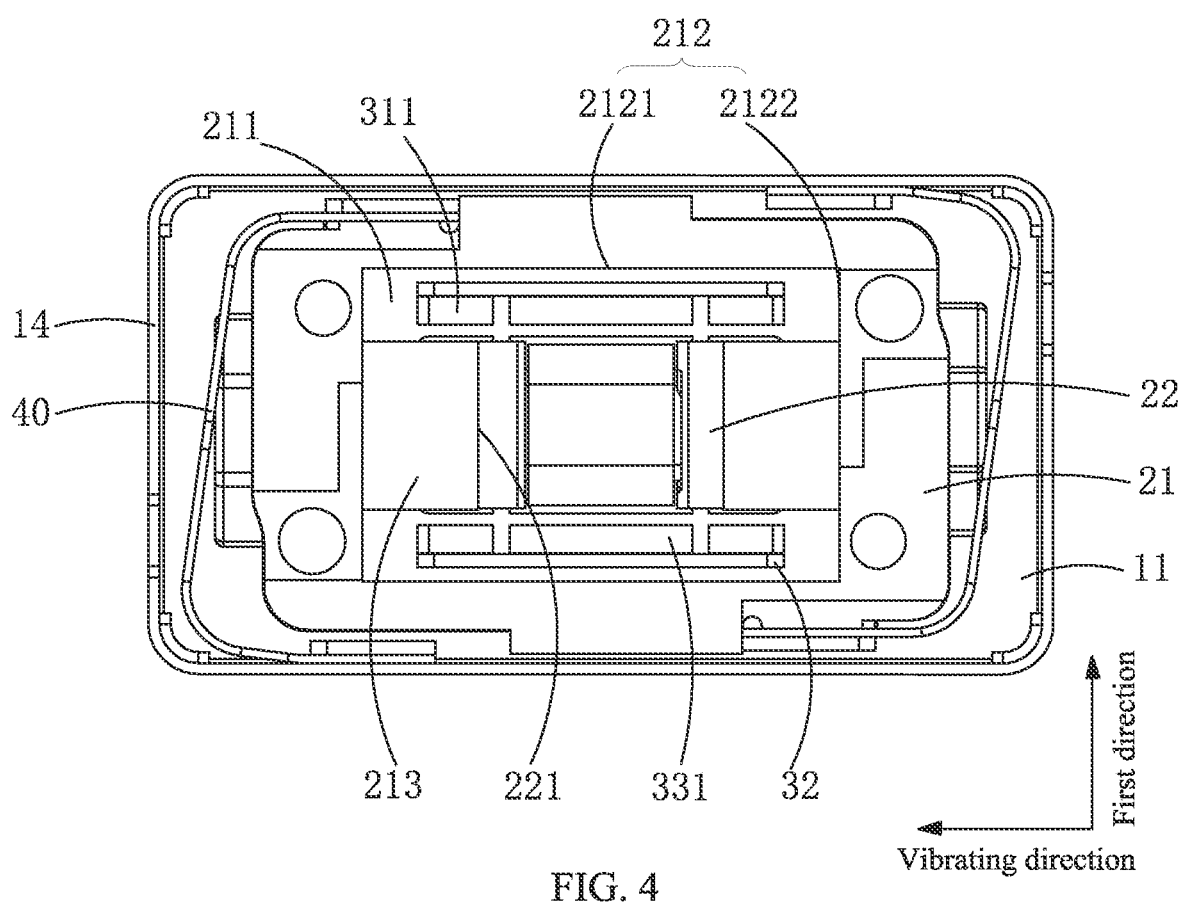
FIG. 4 is a partial structural perspective view of the linear vibration motor in FIG. 1.
Figure 5:
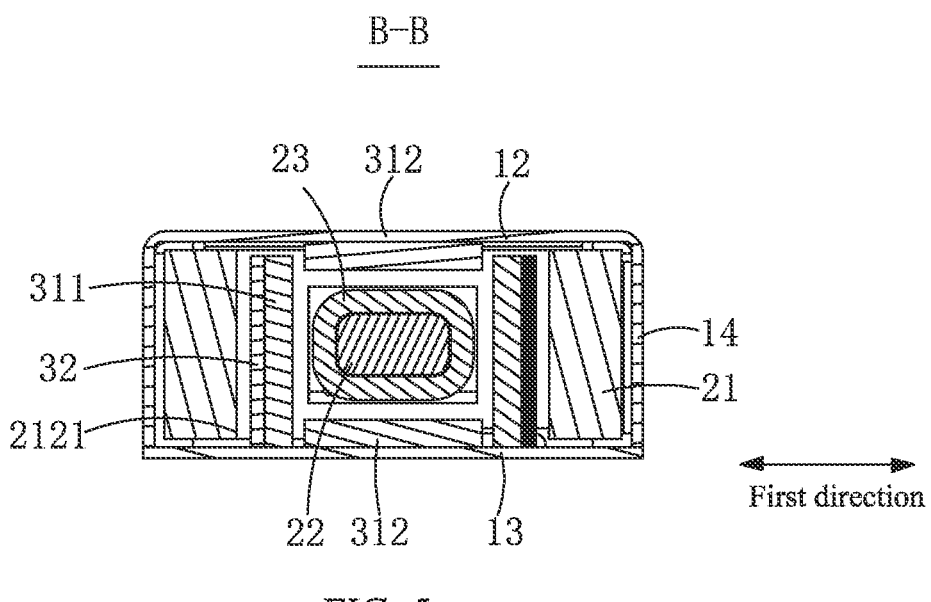
FIG. 5 is a sectional view taken along B-B in FIG. 1.

The technical solutions in embodiments of the present disclosure are described below with reference to the accompanying drawings in the embodiments of the present disclosure.

As shown in FIG. 1 to FIG. 5, a first embodiment of the present disclosure provides a linear vibration motor 100, including a housing 10 having a receiving space 11, a vibration assembly 20 and a stator assembly 30 that are received in the receiving space 11, and an elastic member 40 supporting the vibration assembly 20 in the receiving space 11. The elastic member 40 supports the vibration assembly 20 to vibrate back and forth along a vibrating direction to provide a vibration.

The housing 10 includes an upper cover 12 and a lower cover 13 spaced from each other, and a side wall 14 connecting both the upper cover 12 and the lower cover 13. The upper cover 12, the lower cover 13 and the side wall 14 jointly enclose the receiving space 11.

The vibration assembly 20 includes a weight 21 suspended in the receiving space 11, an iron core 22 fixed to the weight 21, and a coil 23 wound around the iron core 22. For example, the weight 21 has a receiving hole 211 penetrating through the weight, and the iron core 22 and the coil 23 are received in the receiving hole 211. An end of the elastic member 40 is fixed to the side wall 14, and another end of the elastic member 40 is fixed to the weight 21.

As shown in FIG. 2 to FIG. 5, the stator assembly 30 includes a magnet 31 fixed to the housing 10, and the magnet 31 extends into the receiving hole 211 and is spaced from the coil 23 and the weight 21.

The weight 21 includes a side wall 212 enclosing the receiving hole 211, and an end portion of the iron core 22 is fixed to the side wall 212. As can be seen from FIG. 2, the weight 21 is formed as a rectangular shape, and thus the side wall 212 includes first side walls 2121 each extending along a long axis direction and arranged opposite to each other, and second side walls 2122 each extending along a short axis direction and arranged opposite to each other. Further, the magnet 31 includes a first magnet 311 arranged at two sides of the coil 23 along a first direction, and a second magnet 312 arranged at two sides of the coil 23 along a second direction. The first direction, the second direction and the vibrating direction are perpendicular to each other. The receiving hole 211 extends through the weight 21 along the second direction. The first magnet 311 is spaced from the first side wall 2121.

It can be understood that each of two sides of the coil 23 along the first direction is provided with a respective one first magnet 311, and each of two sides of the coil 23 along the second direction is provided with a respective one second magnet 312. Then, the first magnet 311 and the second magnet 312 are spaced and arranged at a periphery of the coil 23. In an embodiment of the present disclosure, the first magnet 311 is magnetized along the first direction. The two first magnets 311 are arranged with same poles facing each other along the first direction. The second magnet 312 is magnetized along the second direction. The two second magnets 312 are arranged with same poles facing each other along the second direction. As can be seen from FIG. 5, one of the two second magnets 312 is fixed to the upper cover 12, and the other one of the two second magnets 312 is fixed to the lower cover 13. In addition, in this embodiment, an end of the first magnet 311 along the second direction is fixed to the lower cover 13, and another end of the first magnet 311 is spaced from the upper cover 12. In other embodiments of the present disclosure, an end of the first magnet 311 may be fixed to the upper cover 12, and another end of the first magnet 311 may be spaced from the lower cover 13. Selections can be made according to actual design requirements.

In this embodiment, a side of the coil 23 along the first direction is provided with three first magnets 311 arranged in sequence along the vibrating direction, and a magnetizing direction of the first magnet 311 arranged at a center is opposite to a magnetizing direction of the first magnet 311 arranged at each of two ends. A side of the coil 23 along the second direction is provided with three second magnets 312 arranged in sequence along the vibrating direction, and a magnetizing direction of the second magnet 312 arranged at a center is opposite to a magnetizing direction of the second magnet 312 arranged at each of two ends.

Figure 6:
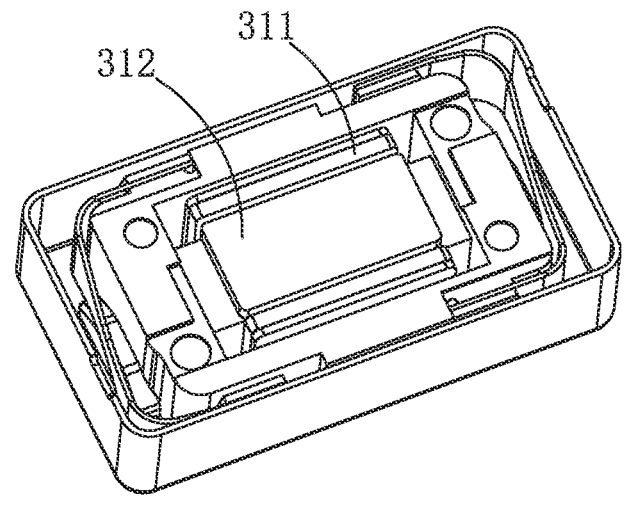
FIG. 6 is a partial structural perspective view of a linear vibration motor according to a second embodiment of the present disclosure.

As shown in FIG. 6, a second embodiment of the present disclosure provides another linear vibration motor, and an only difference between the linear vibration motor in the second embodiment of the present disclosure and the linear vibration motor in the first embodiment of the present disclosure is that each of the first magnet 311 and the second magnet 312 is an integrated magnet with a three-section magnetizing structure. It can be understood that the first magnet 311 includes three magnetizing regions (not shown) arranged along the vibrating direction, and a magnetizing direction of a magnetizing region at a center is opposite to a magnetizing direction of the magnetizing region at each of two ends. Similarly, the second magnet 312 includes three magnetizing regions (not shown) arranged in sequence along the vibrating direction, and a magnetizing direction of a magnetizing region at a center is opposite to a magnetizing direction of the magnetizing region at each of two ends.

To enhance the magnetic field performance of the magnet 31, the stator assembly 30 further includes a first magnetic yoke 32 fixed to a side of the first magnet 311 facing the first side wall 2121, and the first magnetic yoke 32 is spaced from the first side wall 2121.

The weight 21 further includes a fixing boss 213 formed by protruding from the second side wall 2122, and an end portion of the iron core 22 is fixed to the fixing boss 213. Further, the iron core 22 includes an end surface 221 fixed to the fixing boss 213, and the iron core 22 has an adhesive receiving groove 222 formed by recessing in a direction from the end surface 221 away from the fixing boss 213. When the end surface 221 of the iron core 22 is fixed to the fixing boss 213 by an adhesive, the adhesive receiving groove 222 can receive part of the adhesive to prevent adhesive overflow, thereby improving the fixing strength between the iron core 22 and the weight 21, and improving the vibration reliability of the linear vibration motor 100.

Compared with the prior art, the linear vibration motor provided by the present disclosure fixes the iron core and the coil to the weight to serve as the vibration assembly, and the magnet is fixed to the housing to serve as the stator assembly, thereby greatly improving the electromagnetic field utilization rate of the iron core and the coil, enhancing the magnetic field intensity of the magnet, significantly increasing the driving force of the linear vibration motor, and thus improving the vibration performance of the linear vibration motor.

The above description merely describes some of, rather than all of embodiments of the present disclosure, and it can be understood that those skilled in the art can further make improvements without departing from a concept of the present disclosure, but all of these improvements shall fall within a scope of the present disclosure.

What is claimed is:

1. A linear vibration motor, comprising:

a housing having a receiving space;

a vibration assembly and a stator assembly that are received in the receiving space; and an elastic member supporting the vibration assembly in the receiving space, wherein the vibration assembly comprises a weight suspended in the receiving space, and the weight has a receiving hole penetrating through the weight; and wherein the vibration assembly further comprises an iron core fixed to the weight and received in the receiving hole, and a coil wound around the iron core; and the stator assembly comprises a magnet fixed to the housing, and the magnet extends into the receiving hole and is spaced from the coil and the weight;

wherein the weight comprises a side wall enclosing the receiving hole, and an end portion of the iron core is fixed to the side wall; and the weight is formed as a rectangular shape, and the side wall comprises first side walls each extending along a long axis direction and arranged opposite to each other, and second side walls each extending along a short axis direction and arranged opposite to each other;

wherein the magnet comprises two first magnets arranged at two sides of the coil along a first direction and two second magnets arranged at two sides of the coil along a second direction, and the two first magnets and the two second magnet are spaced and arranged at a periphery of the coil; and wherein the first direction, the second direction, and a vibrating direction of the vibration assembly are perpendicular to each other.

2. The linear vibration motor as described in claim 1, wherein the two first magnets are magnetized along the first direction, and the two first magnets are arranged with same direction, and the two first magnets are arranged with same poles facing each other along the first direction; and the two second magnets are magnetized along the second direction, and the two second magnets are arranged with same poles facing each other along the second direction.

3. The linear vibration motor as described in claim 2, wherein each of the two first magnets and the two second magnets is formed as a three-section magnetizing structure.

4. The linear vibration motor as described in claim 2, wherein a side of the coil along the first direction is provided with three first magnets arranged in sequence along the vibrating direction, and a magnetizing direction of the first magnet arranged at a center is opposite to a magnetizing direction of the first magnet arranged at each of two ends; and a side of the coil along the second direction is provided with three second magnets arranged in sequence along the vibrating direction, and a magnetizing direction of the second magnet arranged at a center is opposite to a magnetizing direction of the second magnet arranged at each of two ends.

5. The linear vibration motor as described in claim 1, wherein the weight further comprises a fixing boss formed by protruding from the second side wall, and the end portion of the iron core is fixed to the fixing boss.

6. The linear vibration motor as described in claim 5, wherein the iron core comprises an end surface fixed to the fixing boss, and the iron core has an adhesive receiving groove formed by recessing in a direction from the end surface away from the fixing boss.

7. The linear vibration motor as described in claim 1, wherein the housing comprises an upper cover and a lower cover spaced from each other, and a side wall connecting both the upper cover and the lower cover; wherein the upper cover, the lower cover and the side wall jointly enclose the receiving space, an end of the elastic member is fixed to the side wall, another end of the elastic member is fixed to the weight, and one of the two second magnets is fixed to the upper cover and the other one of the two second magnets is fixed to the lower cover.

* * * * *